Aug. 31, 1965    J. R. URSCHEL    3,203,427
GREEN CORN CUTTER HEAD
Filed June 1, 1962    5 Sheets-Sheet 1

INVENTOR.
JOE R. URSCHEL
BY Charles S. Penfold
ATTORNEY

Fig.-3

Aug. 31, 1965  J. R. URSCHEL  3,203,427
GREEN CORN CUTTER HEAD
Filed June 1, 1962  5 Sheets-Sheet 3

INVENTOR.
JOE R. URSCHEL
BY
Charles S. Penfold
ATTORNEY

Aug. 31, 1965

J. R. URSCHEL 3,203,427

GREEN CORN CUTTER HEAD

Filed June 1, 1962

INVENTOR.
JOE R. URSCHEL

BY
Charles A. Penfold
ATTORNEY

Aug. 31, 1965  J. R. URSCHEL  3,203,427
GREEN CORN CUTTER HEAD

Filed June 1, 1962  5 Sheets-Sheet 5

INVENTOR.
JOE R. URSCHEL
BY Charles S. Penfold
ATTORNEY

United States Patent Office 3,203,427
Patented Aug. 31, 1965

3,203,427
GREEN CORN CUTTER HEAD
Joe R. Urschel, 202 Michigan Ave., Valparaiso, Ind.
Filed June 1, 1962, Ser. No. 199,337
11 Claims. (Cl. 130—9)

The subject invention relates generally to means for conditioning a food product and more particularly is directed to a machine whereby a layer of kernels of an ear of corn can be efficiently cut from the cob.

Commercial corn cutting machinery as used today tends to ignore the uneven shape of ears of corn, and makes the cut as though the ear of corn were perfectly round, perfectly straight and with an even taper from one end to the other. Since ears of corn are not round in cross-section, since most ears of corn are curved from one end to the other, and since most ears of corn do not have an even taper from one end to the other, these commercial corn cutting machines as used today cut some of the kernels too deep and others too shallow so as to waste the corn and make it of low quality.

One of the important objects of the invention is to provide an organization whereby the depth of the cut is automatically gauged according to the diameter of the ear, in such a way as to cut a deeper layer on the large end of the ear than on the small end, and to cut a deeper layer on a large diameter ear than on a small diameter ear to comply with the natural condition of corn that kernels are deeper on the large end of an ear of corn than on the small end, and kernels are deeper on large diameter ears than on small diameter ears of corn, and also to contour gauge the depth of cut at each spot on an ear of corn to comply with the natural condition of corn that the ears are oval in cross-section, that the ears are curved from one end to the other, and that the ears have an uneven taper from one end to the other. The purpose of contour cutting to selective depths is to prevent usable corn remaining on the cob and to prevent cutting into the hard and unusable portion of the cob.

When using commercial corn cutting machinery as used today, if the corn is fed to the machine butt end first, the corn will either jam the cutting knives or the kernels will be torn and ruptured. It is therefore necessary to handfeed these machines so that the pointed end of the ear goes into the machine first.

An object of the invention is to provide a mechanism whereby ears of corn may be fed to the machine either pointed end first or butt end first and thereby make it possible to automatically feed corn to the machine from a simple conveyor.

On some commercial corn cutting machinery as used today, an attempt is made to gauge the depth of cut from the outside of the ear. These gauges slide over the tops of the kernels which tends to rupture the tops of the kernels.

An object of the invention is to provide gauges to control the depth of cut in such a way that the gauges roll gently over the tops of the kernels without injury to the kernels.

With commercial corn cutting machinery as used today, it is desirable to grade ears of corn into different sizes, to then use machines set for a deep cut on the large ears and to use other machines set for a shallow cut on the small ears.

An object of the invention is to provide a mechanism which will cut the corn deep on large ears and shallow on small ears and thereby make it unnecessary to grade ears of corn to size before cutting.

A particular objective of the invention is to provide a machine which comprises, among other things, unique improvements in a cutter assembly, a conveyor mechanism for feeding or conveying the ears of corn to the cutter assembly, and a discharge mechanism for conveying and discharging the ears outwardly.

A significant object of the invention is to provide a cutter assembly which includes an annular rotor, a plurality of cutter devices which are pivotally connected to the rotor for movement in a plane perpendicular to the longitudinal axis of the rotor, and a plurality of gauge devices which are pivotally connected to the rotor and respectively operatively connected to the cutter devices and movable in a different plane perpendicular to the axis of the rotor for gauging the depth of the cuts to be made by knives respectively carried by the cutter devices.

A specific object of the invention is to provide each of the cutter devices with a knife of unique design and construction whereby to obtain efficient cutting of the kernels relatively close to the cob.

Another object of the invention is to provide a conveyor whereby the ears of corn are held against rotation while being fed and subjected to the cutting action of the knives on the cutter devices.

A further object of the invention is to provide a mechanism whereby the cob of each ear is gripped and held against rotation while being conveyed and discharged. This holding action in combination with that imparted by the ear feeding conveyor serves to support the extremities of the ear and stabilize its travel while the kernels are being cut at a location intermediate the extremities of the ear.

A specific object of the invention is to provide a novel organization for resiliently urging components of the feeding and discharge mechanism into engagement with the kernel layer and cob of the ears.

Other attributes of the invention reside in providing a machine which offers advantages with respect to manufacture and assembly, durability, and efficiency in operation.

Additional objects and advaantages of the invention will become apparent after the description hereinafter set forth is considered in conjunction with the drawings annexed hereto.

The machine as illustrated in the drawings comprises a framework generally designated 1 supporting a cutter assembly 2, a large motor 3 for driving the cutter assembly and a small motor 4 for simultaneously driving a conveyor 5 for feeding a product, such as an ear of corn 6, to the cutter assembly to remove the corn from the cob and a mechanism 7 disposed below the cutter assembly for conveying and discharging the cob from the machine.

Figure 1:
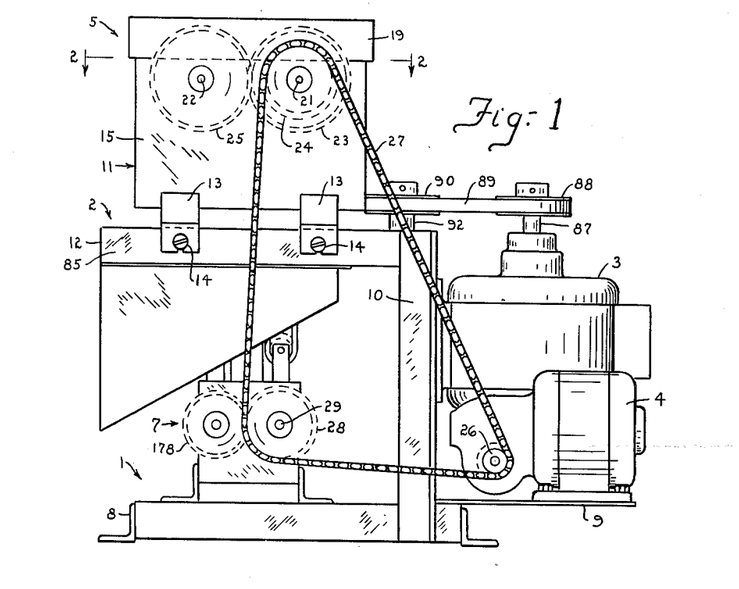
FIGURE 1 is an elevational view of the machine.

The conveyor or feeding mechanism 5, shown in FIGURES 1 through 3, as will be described subsequently, includes a pair of opposed driven conveyor belts or chains for engaging an ear of corn and a pair of opposed idler belts or chains for engaging and stabilizing the ear while it is being cut. The framework 1, above referred to, is of sturdy construction and includes a base 8 which directly supports the discharge mechanism 7, an elevated platform 9 extending laterally from the base for supporting the small motor 4, a vertical frame 10 which serves to support the large motor 3 above the platform and the cutter assembly 2 above the discharge mechanism 7. The conveyor 5 is substantially arranged in a square shaped housing generally designated 11 which is detachably supported on a casing 12 of the cutter assembly by a plurality of lugs 13 carried by sides of the housing 11. The lugs have offset portions which rest on the casing and slotted portions through which screws 14 extend into side walls of the casing for firmly anchoring the housing in spaced relation to and above the casing.

The housing 11 includes a pair of opposed parallel vertical side walls 15 and 16, a pair of similar side walls 17 and 18, and a tray 19 is mounted on the side walls and has a bottom wall provided with a center aperture and a tubular depending guide 20 carried by the bottom wall and aligned with the aperture for guiding ears of corn into the conveyor 5. A pair of short horizontal rotatable driven shafts 21 and 22 extend through the side wall 15. A gear 23 and a sprocket 24 are keyed to the shaft 21 and a gear 25 is keyed to the shaft 22 and meshes with the gear 23. The small motor 4 has a drive shaft provided with a sprocket 26 and a chain 27 operatively connects this sprocket with the sprocket 24 of the conveyor 5 and a sprocket 28 on a shaft 29 of the discharge mechanism 7 for simultaneously driving the conveyor and mechanism in synchronism.

The side walls 15, 16, 17 and 18 of the housing 11 are respectively provided with U-shaped brackets generally designated 30, 31, 32 and 33, which are fixedly secured to the inner surfaces of the walls adjacent their upper edges. Each of these brackets includes a base wall 34 and sides 35 having aligned holes therein for supporting a shaft. A sprocket 36 is keyed to the shaft 21 and an oscillatable shaft 37 is aligned with the rotatable shaft 21 and is journalled in the wall 16 and sides 35 of the bracket 31. The inner end of the oscillatable shaft rides free in the hub of the sprocket 36 as shown in FIGURE 2a. The rotatable driven shaft 22 is mounted in substantially the same manner that the driven shaft 21 is mounted and carries a sprocket 38. An oscillatable shaft 39 aligned with shaft 22 is mounted in substantially the same way that shaft 37 aligned with shaft 21 is mounted.

Figure 2:
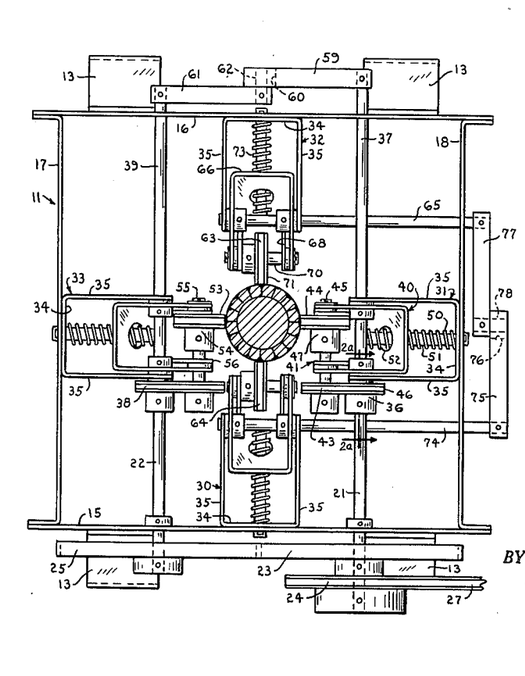
FIGURE 2 is an enlarged horizontal section taken substantially on line 2—2 of FIGURE 1 illustrating details of the ear conveyor or feeding mechanism.
Figure 2A:
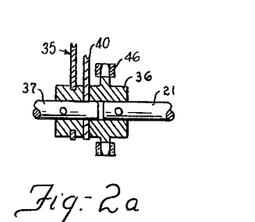
FIGURE 2a is an enlarged partial sectional view taken substantially on line 2a—2a of FIGURE 2 showing an end-to-end relationship of certain shafts constituting components of the machine.
Figure 3:
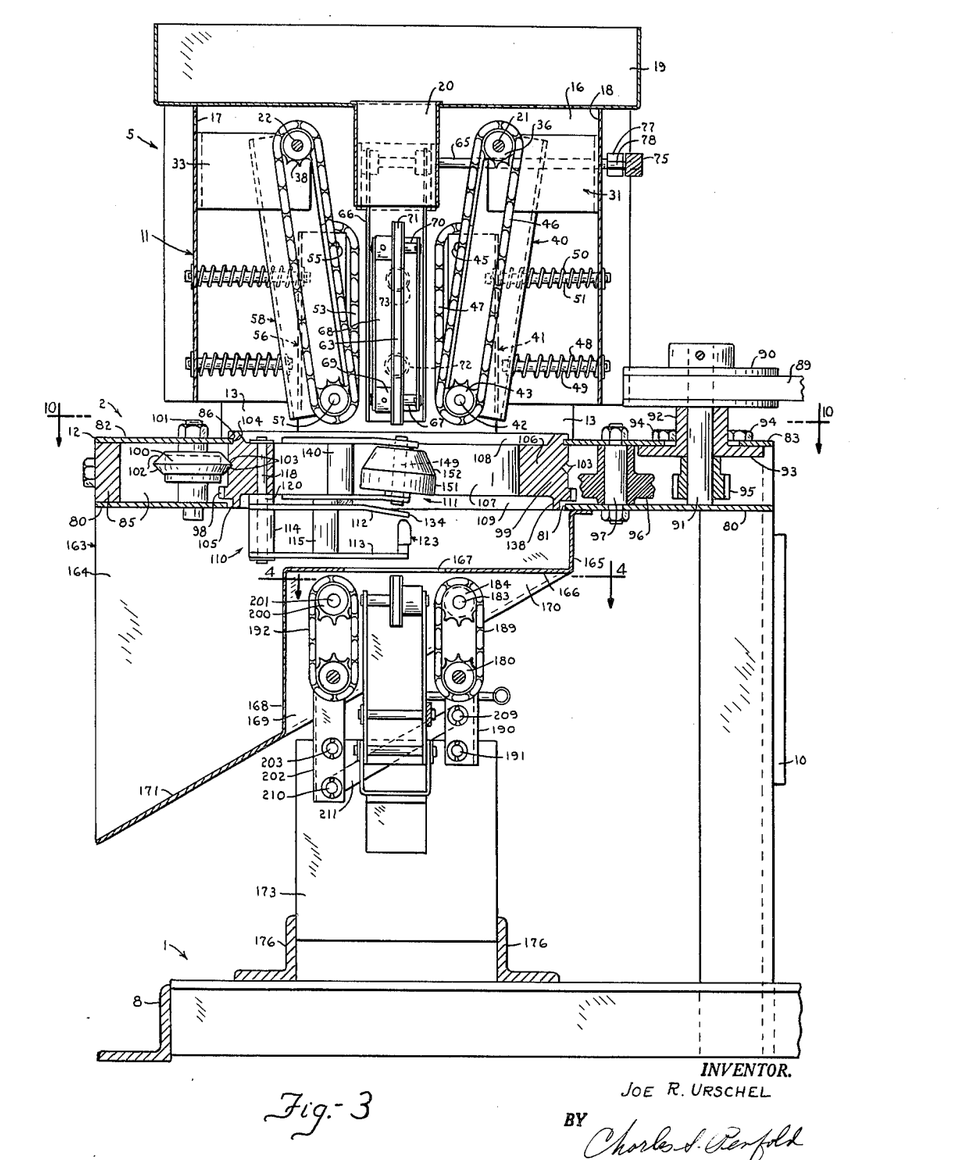
FIGURE 3 is an enlarged vertical section taken substantially on line 3—3 of FIGURE 4.

As clearly depicted in FIGURES 2 and 3, the upper end of an outer channel, member or support generally designated 40 is keyed to the oscillatable shaft 37 at a location between the sides 35 of the bracket 31 for swinging movement in a vertical plane about the axis of the shaft and an inner channel, member, or support generally designated 41, shorter in length then channel 40, has its lower end pivotally mounted on a lower short rotatable shaft 42 journalled in the lower end of the channel 40. A sprocket 43 is keyed to the lower shaft 42 and another sprocket, not shown, is also keyed to this shaft. A sprocket 44 is keyed to a short upper shaft 45 journalled in the upper end of the inner channel 41. A long chain 46 operatively connects the sprockets 36 and 43 and a short chain or belt 47 operatively connects the sprocket 44 with another sprocket (not shown) on the shaft 42. With this unique organization the motor 4 drives the shaft 21, which in turn, through the agency of all other mechanisms described, causes the inner length or side of the short belt 47 to move in the direction of the arrow as indicated in FIGURE 3 for engagement with an ear of corn to assist in feeding it vertically downward for subjection to the cutter assembly 2. Each of the long and short channels 40 and 41 includes a base wall and a pair of side walls. The shafts 37, 42 and 45 extend through the side walls. As shown in FIGURES 2 and 3, a helical spring 48 is mounted on a rod 49 extending through the wall 18 of the housing 11 and a base wall of the long channel 40 for engaging this wall to normally urge or resiliently support the lower ends of the channels in a direction toward the longitudinal axis of a vertical passage, defined in part by the tubular guide 20, through which the ears of corn travel. Another helical spring 50 is mounted on a rod 51 extending through the wall 18 and base walls of the long and short channels, with the spring extending through a clearance opening 52 in the base wall of the long channel 40 for engaging the base wall of the short channel to assist in urging the upper part of the short channel 41 and short chain 47 relative to the axis of the shaft 42 toward the passage and independently of the spring 48. However, both springs jointly serve to assist in maintaining the inner length of the short chain in a predetermined position.

A short conveyor chain or belt 53 is disposed in diametrically opposed relation to the short conveyor chain or belt 47 for synchronous movement therewith for resiliently engaging an opposite side of an ear of corn whereby to assist the driving or conveyor chain 47 in feeding ears successively to the cutter assembly 2. The chain 53 is carried by a sprocket 54 keyed to a shaft 55 extending through an outer upper end of an inner short channel 56 and to another sprocket (not shown) carried by a shaft 57 which extends through the lower end of the inner channel and an outer long channel 58. The short chain 53, sprocket 54, shafts 55 and 57 and the channels 56 and 58 respectively correspond to the short chain 47, sprocket 44, shafts 45 and 42 and the channels 41 and 40 and related components serve to establish a driving connection between the chain 53 and the driven shaft 22. Otherwise expressed, the various interconnected means for operating the short chain 53 are substantially identical with the means employed for operating the short chain 47.

As exemplified in FIGURE 2 and as alluded to above, the oscillating shafts 37 and 39 extend through the wall 16 of the housing 11. The shaft 37 is provided with a link 59, located exteriorly of the housing, which has one end keyed to the shaft and an opposite end having a longitudinal slot 60 therein. A link 61, similar to the link 59, has one end keyed to the oscillating shaft 39 and an opposite end which carries a pin 62 which is slidably mounted in the slot 60 of the link 59. With this novel organization, if the short ear driving belt 47 is moved inwardly or outwardly by an ear of corn, a corresponding movement will be imparted to the short belt 53 so that these belts, although independently driven by the shafts 21 and 22, will jointly coact or function to resiliently grip and uniformly feed each ear as it is introduced thereto through the guide 20 carried by the tray 19.

Additional short chains or belts 63 and 64, disposed diametrically opposite one another, are also employed in conjunction with the driving or conveyor chains or belts 47 and 53 to assist in guiding and stabilizing each ear as it is conveyed. The chains or belts 63 and 64 are not driven from the motor 4 but do travel in response to the movement of the ear. The mode of mounting the chains or belts 63 and 64 will now be described.

As illustrated in FIGURES 2 and 3, an oscillating shaft 65 extends through a wall 18 of the housing 11 and through the side walls 35 of the bracket generally designated 32. An outer long channel 66 has its upper end keyed to the shaft and a short shaft 67 extends through the lower ends of the channel 66 and an inner short channel 68 and carries a sprocket 69. A short shaft 70 extends through the upper end of the inner channel and carries a sprocket 71. The chain or belt 63 is carried by the sprockets 69 and 71 and springs 72 and 73, similar to springs 48 and 50, above referred to, are preferably utilized to respectively urge and position the outer and inner channels relative to the ear receiving passage, defined in part by the driven chains 47 and 53 and the idling chains 63 and 64. The chain 64 is mounted in a manner similar to the chain 63 and includes an oscillating shaft 74 similar to the shaft 65. A link 75 has one end keyed to the shaft 74 and an opposite end provided with a longitudinal slot 76. A link 77, similar to the link 75, has one end keyed to the shaft 65 and an opposite end provided with a pin 78 slidably mounted in the slot 76. This arrangement is similar to that between the links 59 and 61, respectively carried by the oscillating shafts 37 and 39 for substantially the same purpose.

The cutter assembly generally designated 2 and the components thereof are clearly exemplified in FIGURES 3 and 7 through 16 and will now be described. The casing 12 for the operating components as depicted in FIGURES 1, 3 and 10 preferably comprises a bottom wall 80 provided with a central round opening 81, a top wall comprised of plates 82 and 83 which are detachably secured by screws 84 extending through the plates into tapped holes therefor in horizontal rails 85. The rails, top and bottom walls form the casing 12. Each of the plates is provided with an arcuate cutout which cutouts, in combination, define an opening 86 substantially of the same diameter as the opening 81. These openings are axially aligned with the longitudinal axis of the conveyor assembly 5.

The cutter assembly is driven by the large motor 3. This motor has a drive shaft 87, with a pulley 88 keyed thereto which is operatively connected by a belt 89 to a pulley 90 keyed to a vertical shaft 91 journaled in a bearing 92. This bearing includes a tubular portion through which the shaft 91 is journalled and a radial annular flange 93 disposed in the casing 12 and detachably secured against the under surface of the plate 83 by screws 94. A small gear 95 is keyed to the lower end of shaft 91 and meshes with a large gear 96 disposed in the casing and rotatable on a shaft 97 extending through the plate 83 and the bottom wall 80 of the casing 12. The gear 96 meshes with teeth 98 extending from a lower portion of the periphery of a relatively large annular rotor 99 mounted on three equally spaced rollers 100. Each of the rollers is preferably mounted on ball bearings (not shown) carried by a stationary shaft 101 extending transversely through the casing and detachably connected thereto. Each of the rollers is provided with a pair of converging portions forming inclined bearing surfaces 102 which cooperate with a pair of matching converging bearing surfaces 103 defining a track or groove in the periphery of the rotor at a location above the teeth 98 thereon. The rotor 99 actually constitutes a large gear mounted on three rotatable bearings in lieu of being mounted on a shaft in a conventional manner. It will be noted in FIGURE 3 that the periphery of the rotor is interrupted by an annular groove 104 which receives the arcuate marginal edges of the cutouts defining the opening 86 in the plates 82 and 83, the purpose of which is to assist in preventing foreign matter, including pieces of corn and/or juice from seeping in between the moving components. The lower portion of the rotor is also preferably formed to provide a rabbet 105 which receives the marginal edge defining the opening 81 in the bottom wall of the casing and so that a portion of the rotor will extend into this opening. This fit between the bottom wall and rotor also assists in preventing radial entry of small pieces of corn and/or juice into the casing 12 beyond the peripheral confines of the rotor.

Figure 9:
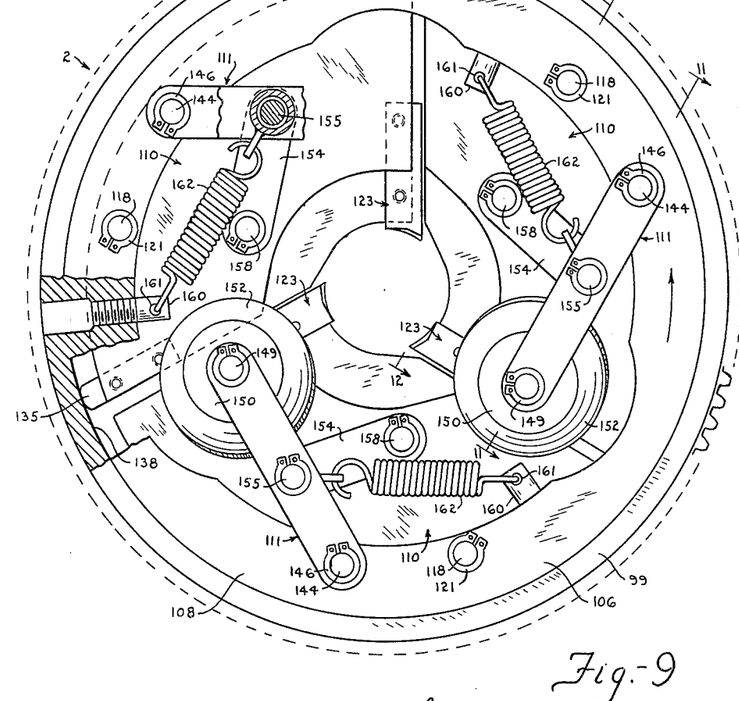
FIGURE 9 is an enlarged horizontal plan view of the rotor, with a portion thereof in section, and cutter and gauge devices which are operatively connected to the rotor.
Figure 10:
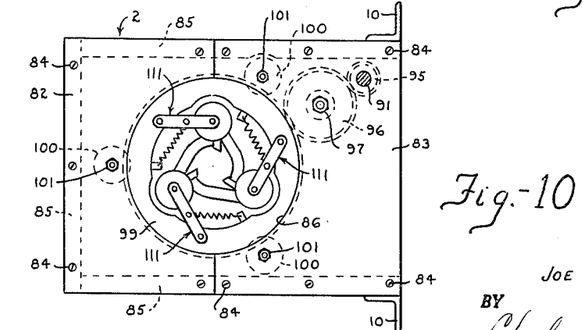
FIGURE 10 is a horizontal section taken substantially on line 10—10 of FIGURE 3 showing a casing within which the rotor and components associated therewith are disposed.

The rotor 99, as depicted particularly in FIGURES 3, 9 and 10, is further preferably formed to provide an internal radial annular flange 106 having an axial thickness somewhat less than the overall thickness of the rotor. Otherwise expressed, the rotor is provided with a large axial opening 107 and adjacent annular recesses 108 and 109 in opposite sides thereof. A plurality of preferably three corresponding cutter devices generally designated 110 and a plurality of preferably three corresponding gauge devices generally designated 111 are operatively associated with one another and individually pivotally connected to the flange 106 for movement in different planes perpendicular to the longitudinal axis of the rotor.

The cutter devices or units 110 are clearly shown in FIGURES 3, 9 and 12 through 16 and each preferably comprises similar arcuate planar upper and lower members 112 and 113 which are permanently secured together in parallel relation by a pair of tubular spacers 114 and 115. The ends of these spacers are preferably welded at 116 to the opposed inner faces of the members and in alignment with holes 117 provided in the members. An elongate pivot 118 extends through the tubular spacer 114 and holes 117 aligned therewith, through a hole 119 in the radial flange 106 of the rotor and washers 120 interposed between the upper member 112 and undersurface of the flange, with spring clips 121, or equivalent means, disposed in grooves 122 provided in the ends of the pivot for detachably locking the pivot and cutter device to the rotor. The washers 120 serve to axially space each of the cutter devices below an adjacent gauge device for clearance purposes as shown in FIGURE 3. It will be observed by referring to FIGURES 3 and 12 that the cutter devices are supported on the flange of the rotor for horizontal movement about the axis of the pivot 118, substantially below the casing 12 and that the lower member 113 of each cutter device carries a knife generally designated 123 which is normally located a predetermined radial distance from the longitudinal axis of the path travelled by the ears of corn.

Figures 11, 12, 13, 14, 15, 16:
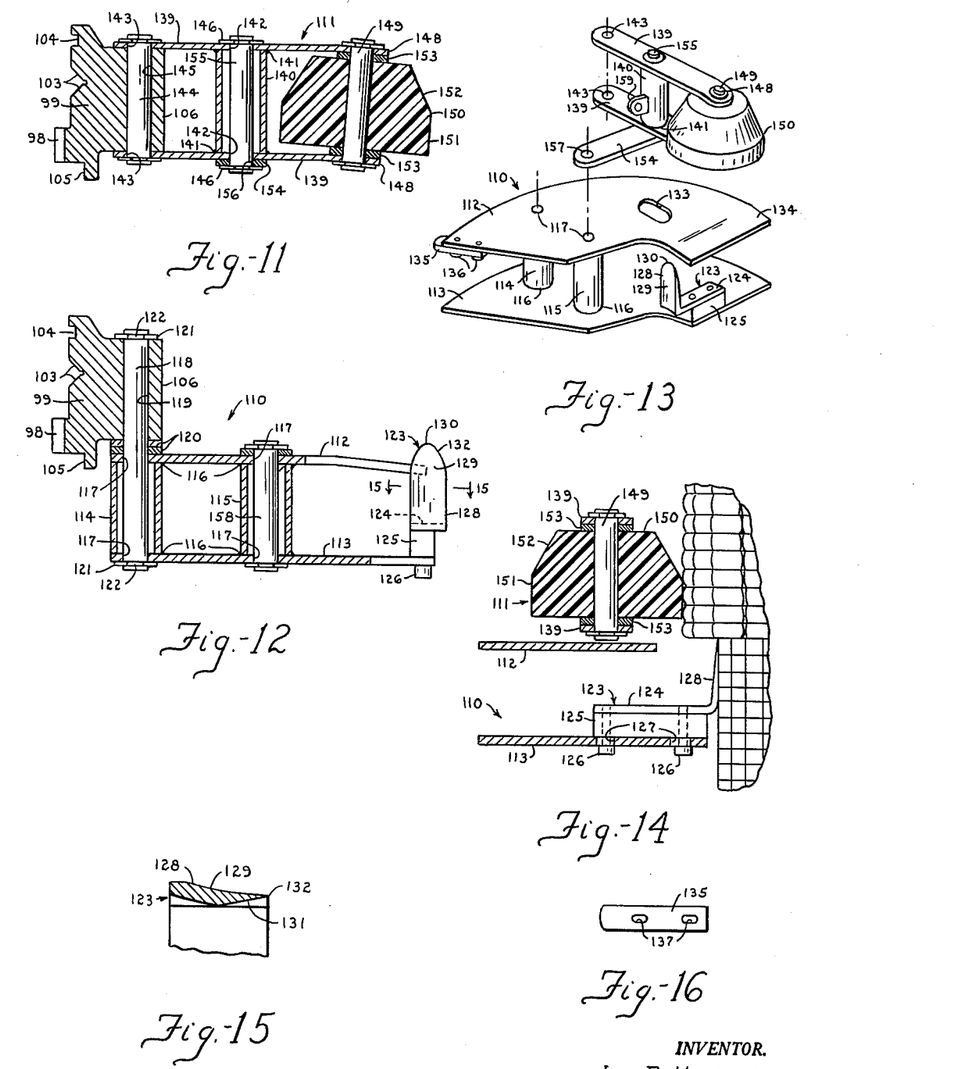
FIGURE 11 is an enlarged vertical section taken substantially on line 11—11 of FIGURE 9 through one of three gauge devices depicting details thereof.
FIGURE 12 is an enlarged vertical section taken substantially on line 12—12 of FIGURE 9 through one of three cutter devices depicting details thereof.
FIGURE 13 is an enlarged view showing the relationship of a cutter device and a gauge device and certain structural features thereof.
FIGURE 14 is an enlarged partial vertical portion of an ear of corn showing relative operative positions of a cutter device and gauge device with respect to the ear.
FIGURE 15 is a view of one of the three knives adapted for support on the cutter devices.
FIGURE 16 is a top view of one of three abutments adapted for connection to each of the cutter devices.

Each of the knives 123 preferably includes a rectangular planar base 124 which is detachably secured against an upper face of a block 125 by screws 126 which respectively extend upwardly through aligned long longitudinal slots 127 provided therefor in the lower member 113, as evidenced in FIGURE 14, to facilitate adjustment of the block and knife so that a blade portion 128 of the latter can be disposed in a proper cutting position for removing the layer of kernels of the corn. The blade portion is arranged substantially perpendicular to the base portion and preferably provided with an elongate smooth concave face 129 extending substantially throughout the length thereof and lengthwise of the ear so as to substantially conform to the external cylindrical surface of the cob in order that the knife will sever the kernels relatively close to the cob. It will be noted hat the blade portion of each knife is provided with a rounded nose 130, a rake or clearance portion 131 and intersecting surfaces to define a sharp leading edge 132 for efficient cutting.

It will be observed in FIGURE 13 that the upper member 112 of each cutter device is provided with a slot 133, an extremity 134 downturned generally toward the knife, and an abutment 135 detachably and adjustably connected to the opposite extremity of the member against its underside by screws 136 extending upwardly through slots 137 provided therefor in the abutment. The downturned extremity serves to provide clearance between components of each gauge device and each cutter device and each abutment is adapted to normally engage an internal cylindrical surface 138 of the recess formed in the underside of the rotor to locate the blade portion of the knife in a predetermined position relative to the longitudinal axis of the machine as shown in FIGURE 9.

Each of the gauge devices 111 preferably includes a pair of substantially corresponding elongate members or bars 139 permanently secured together by a tubular spacer 140 having its ends welded to the inner surfaces of the members as at 141 in alignment with holes 142 provided therefor in the members. The inner ends of the members are provided with aligned holes 143 and a pivot 144 extends through these holes and a hole 145 in the flange 106 of the rotor, with spring clips 146 seated in grooves 147 provided in the ends of the pivot for detachably pivotally connecting the device to the rotor for movement in a plane perpendicular to the axis of the rotor and parallel to the plane of movement of the cutter device. The outer extremities of the members 139 are preferably offset downwardly to provide parallel portions 148 disposed at an oblique angle with reference to the longitudinal axis of the cutter assembly. A pivot 149 extends through aligned holes in the portions and rotatably supports a roller 150, preferably of nylon, between the members so that a substantial portion of the roller extends outwardly therefrom. Each roller includes a cylindrical portion 151 and a truncated cam portion 152, the latter of which initially serves to engage and assist in centering each ear of corn and so that the ear will cam the gauge device outwardly until it rides on the cylindrical surface of the layer of kernels as shown in FIGURE 14. The rollers assist in feeding, guiding and stabilizing each ear. Spring clips, like the other clips, respectively engage the ends of the pivots 144 and 149 to afford detachability of each gauge device with respect to the rotor and detachability of each roller with respect to its members 139. Washers 153 are interposed between the ends of each roller and its supporting members as shown in FIGURES 11 and 14.

In view of the foregoing, it will be manifest that the members 112 and 113 of each cutter device constitute an elongate support means which carries a knife and that the members 139 of each gauge device constitute an elongate support which carries a roller.

A link 154 has one end pivotally and detachably secured to the lower end of a pivot 155 which extends through the tubular spacer 140 of each gauge device and the aligned hole 142. The aforesaid end of the link is provided with a hole 156 through which the pivot 155 extends and the opposite end of this link is provided with a hole 157 which pivotally receives the upper end of a pivot 158 extending through the tubular spacer 115 of each cutter device 110. The pivots 155 and 158 are detachably held in place by spring clips. The spacer 140 of each gauge device is provided with an apertured lug 159 and the rotor 99 is provided with three screws 160, each having an aperture 161 therein which receive one end of a helical spring 162, the opposite end of the spring device being engaged in the aperture 159 of the lug. The three springs 162 respectively serve to normally urge each of the three cutter devices and its associated gauge device in a clockwise direction as viewed in FIGURE 9 to cause the abutments 135 on the cutter devices to engage the surface 138 of the rotor and thereby respectively locate the rollers and knives in predetermined relative positions with respect to one another and the longitudinal axis of the machine.

Attention is directed to the important fact that the distance between the axes of the pivots 144 and 155 of each of the gauge devices is less than the distance between the axes of the pivots 118 and 158 of each cutter device and that the distance between the axes of the pivots 155 and 158 is less than the distance between the axes of pivots 118 and 144 so that when each cutter device and its associated gauge device are cammed outwardly by an ear engaging the cams 152 of the rollers 150 the gauge devices will move outwardly in a radial plane greater proportional distances than the cutter devices in order to locate the knives to automatically take advantage of any variations in the diametrical dimensions of the cob and thickness of the kernel layer. Otherwise expressed, the rollers and knives are so operatively connected that the rollers automatically gauge the depth of the cut in proportion to the thickness of the layer.

A member generally designated 163 is mounted between the casing 12 and the discharge mechanism 7 for receiving and guiding the cut or severed kernels from the cutter devices. This member is preferably detachably secured to the underside of the casing 12 and includes a receiver portion having an open top disposed directly below the cutter assembly, a pair of side walls 164 (one shown), a side wall 165 and a bottom wall 166 provided with a cob receiving opening 167 axially aligned with the discharge mechanism and the openings in the casing 12. The member 163 is also formed to provide a vertical wall 168 and a pair of parallel walls 169 (one shown) which in combination with the bottom wall 166 and wall 168 define a channel-like recess 170 which partially receives the upper extremity of the discharge mechanism. The member further includes an inclined wall 171, portions of which are located on opposite sides of the vertical walls 169 whereby to assist in directing the cut kernels or product away from the machine for deposit in a container or onto a conveyor not shown.

The discharge mechanism generally designated 7, illustrated in FIGURES 1 and 3 through 8, will now be described. This mechanism, as will be pointed out subsequently, includes a pair of opposed driven belts or chains provided for engaging and stabilizing each ear in its forward travel and a pair of opposed rollers which operate in conjunction with the belts to additionally guide and stabilize movement of each ear. Stabilizing the cob end through this mechanism and the uncut end of the ear by the feeding conveyor 5 has proven desirable as it allows the cutter devices therebetween to accurately and uniformly cut the kernels when the rotor is rotated.

The mechanism 7 is primarily supported on a pair of parallel vertical walls 173 and 174 and a vertical wall 175 adjacent the wall 174. These walls are preferably welded to a sub-structure 176 mounted on the base 8 of the machine framework 1.

The shaft 29, which carries the sprocket 28 and chain 27 connected to this sprocket and motor 4, is journalled on the walls 174 and 175 and also carries a gear 177 keyed thereto which meshes with a gear 178 keyed to a horizontal shaft 179 disposed at the same level as shaft 29 so that rotation of the latter will effect simultaneous rotation of shaft 179. The shaft 29 also carries a sprocket 180 keyed thereto and its inner end is rotatably mounted in side walls 181 of a channel 182 as shown in FIGURE 5.

A shaft 183 extends through the side walls at the upper end of the channel 182 and a pair of sprockets 184 and 185 are respectively keyed to the ends of this shaft exteriorly of the channel. The sprocket 185 is operatively connected by a chain 186 to the sprocket 180 on the shaft 29 and the sprocket 184 is operatively connected to a sprocket 187 on a shaft 188 by a chain or conveyor belt 189. The shaft 188 is journalled in the upper portions of a pair of side walls of a channel 190 and a shaft 191 is fixed to the wall 173 and extends through the lower portions of the side walls of the channel 190 for pivotally supporting this channel. With this setup an inner side or length of the belt is disposed for engaging the cob end of an ear and assists in forcing it downwardly.

Figure 4:
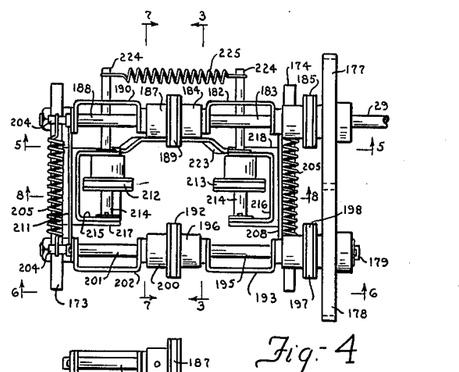
FIGURE 4 is a horizontal view of a cob discharging or conveyor mechanism as it appears when viewed from line 4—4 of FIGURE 3.
Figure 6:
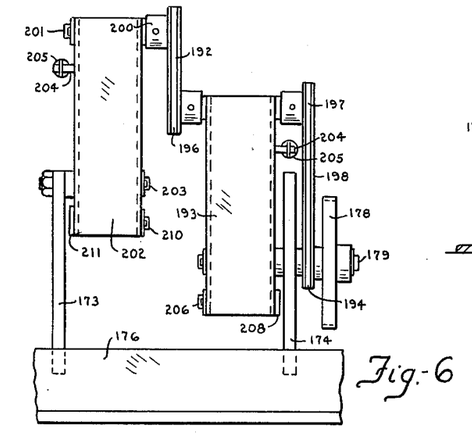
FIGURE 6 is an elevational view of the mechanism of FIGURES 4 and 5, looking in the direction of the arrows 6—6.

As depicted in FIGURES 4 and 6, another chain or conveyor belt 192 is disposed diametrically opposite the belt 189 so that both operate in unison to grip and direct an ear downwardly. The belt 192 is driven by a system of shafts, sprockets and chains in a manner similar to those employed to actuate the belt 189. More particularly in this regard, the shaft 179 extends through the lower portions of side walls of a channel 193 for supporting the latter and a sprocket 194, in addition to the gear 178, is keyed to this shaft. A shaft 195 extends through the upper part of the channel 193 and has sprockets 196 and 197 respectively keyed to its ends. A chain 198 operatively connects the sprockets 194 and 197 and the chain 192 connects the sprocket 196 with a sprocket 200 keyed to a shaft 201 pivoted in the upper end of a channel 202. A shaft 203 fixed on the wall 173 extends through the lower end of the channel 202 for pivotally supporting this channel in a mode similar to that of supporting the other channels 182, 190 and 193.

Figure 5:
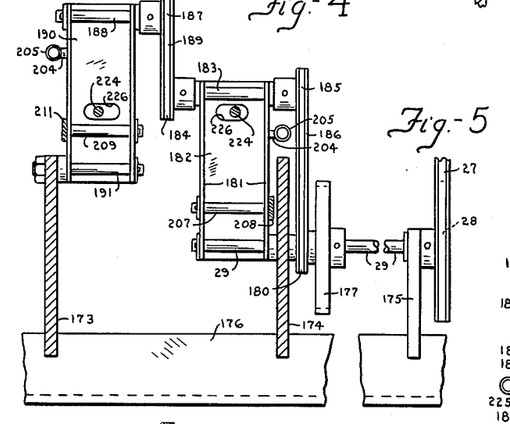
FIGURE 5 is a vertical section taken substantially on line 5—5 of FIGURE 4 depicting the general arrangement of corresponding components of the discharge mechanism.

It will be observed in FIGURES 5 and 6 that each of the channels 182 and 190 is provided with a lug 204 and in FIGURE 6 that each of the channels 193 and 202 is provided with a similar lug 204. A helical spring 205 has its ends connected to the lugs on the channels 182 and 193 and a similar spring 205 has its ends connected to the lugs on the channels 190 and 202. These springs serve to urge the pair of channels 182 and 190 toward the pair of channels 193 and 202, and vise-versa so that the conveyor chains or belts 189 and 192 will grip the cob and direct it outwardly.

It will also be observed in FIGURES 4, 5 and 7 that the lower end of the channel 193 is provided with a pin 206 located below the shaft 179 and that the channel 182 is provided with a pin 207 located above the shaft 29, with a link 208 diagonally connected to the pins so that if either channel is pivoted the other will pivot in unison therewith. It will be further observed in FIGURES 3, 4 and 5 that the channel 190 has a pin 209 above the pivot shaft 191 and the channel 202 a pin 210, with a link 211 connecting the pins so that both of these channels will move in unison in response to pressure applied to either one. With this unique organization the conveyor chains or belts 189 and 192 will readily automatically adjust themselves in gripping the cob.

Figure 7:
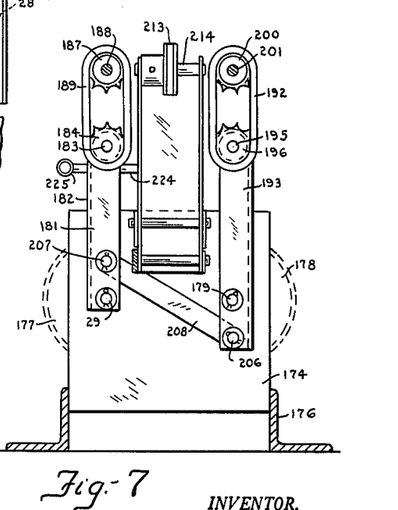
FIGURE 7 is a vertical section taken substantially on the line 7—7 of FIGURE 4.
Figure 8:
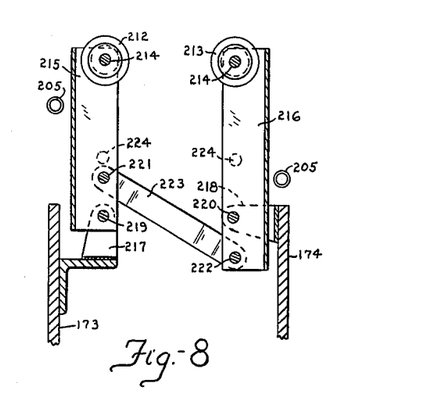
FIGURE 8 is a vertical section taken substantially on line 8—8 of FIGURE 4.

The mechanism 7, as depicted in FIGURES 3, 7 and 8, and alluded to above, includes a pair of idling rollers 212 and 213 journalled on shafts 214 respectively carried by a pair of opposed channels 215 and 216. A pair of brackets 217 and 218 are respectively anchored to opposed vertical walls 173 and 174. The channel 215 is somewhat shorter than channel 216 and its lower end is pivoted on a shaft 219 carried by the bracket 217 and the lower end of channel 216 is pivoted on a shaft 220 carried by the bracket 218. The channel 215 is provided with a pin 221 located above the shaft 219 and the channel 216 with a pin 222 below the shaft 220, with a link 223 connected to the pins so that these channels will pivot in unison. Each of these channels is further provided with a laterally extending arm 224, which arms are connected together by a spring 225, the purpose of which is to influence the movement of the channels to urge the rollers to yieldably engage the cob. As shown in FIGURE 4, the arms 224 respectively project through clearance slots 226 provided therefor in the base walls of the channels 182 and 190. The rollers, although not driven like the belts 189 and 192, are nevertheless rotated by engagement with the cob and assist in stabilizing the position of the ear for accurate cutting.

The operation of the machine is apparent in view of the foregoing description. Some ears of corn can be placed on the tray 19 for convenience in manually selectively inserting them downwardly into the guide 20 depending from the tray so that the fore end of each ear can be gripped and held against rotation between the belts of the conveyor 5 for delivery to the rotating cutter assembly where the ear engages the cams 152 of the rollers 150 to cause simultaneously outward movement of the cutter and gauge devices and so that the rollers will rollingly engage the peripheral surface of the kernel layer in a manner to predetermine the position of the cutting edges of the knives for gradually accurately cutting the kernels. The kernels as cut are directed generally radially outward from the cutter devices and onto and from the member 163, since these devices are located in a plane below the rotor. A portion of the layer of kernels is severed from the fore end of each ear before it reaches the discharge mechanism 7 and while the knives are still cutting, the cob end entering this mechanism is gripped by the belts 189 and 192 and the rollers 212 and 213 and moved along by the belts for discharge.

Having thus described my invention, it is obvious that various modifications may be made in the same without departing from the spirit of the invention, and therefore, I do not wish to be understood as limiting myself to the exact forms, constructions, arrangements, and combinations of parts herein shown and described.

I claim:

1. A machine for cutting kernels from an ear of corn, said machine comprising a mounting, an annular rotor supported for rotation on said mounting, a plurality of cutter devices pivotally connected to said rotor, a plurality of gauge devices pivotally connected to said rotor and operatively connected to said cutter devices, said connected cutter and gauge devices constituting assemblies which are movable independently of one another in response to pressure from an ear when initially introduced between said gauge devices for imparting movement to said cutter devices in direct proportion to the movement of said gauge devices for cutting the kernels from the ear, means for rotating as a unit said rotor and said cutter devices and gauge devices carried by said rotor, and means for holding the ear against rotation while it is being conveyed and cut.

2. A machine for cutting kernels from an ear of corn, said machine comprising a mounting provided with a plurality of rollers, an annular rotor carried by said rollers and provided with a central opening, a plurality of cutter devices pivotally connected to said rotor, a plurality of gauge devices pivotally connected to said rotor and operatively connected to said cutter devices whereby each connected cutter device and gauge device constitutes an independently operable assembly, said gauge devices being movable in response to pressure from an ear when introduced between these devices for imparting movement to said cutter devices in direct proportion to the movement of said gauge devices for cutting the kernels from the ear, a plurality of resilient means respectively connected to said assemblies for independently biasing the same toward the center of said opening, means for rotating as a unit said rotor and said cutter devices and gauge devices carried by said rotor, means disposed above said unit for gripping and conveying the ear to said cutter devices and said gauge devices, and means disposed below said unit for gripping and conveying the cob while at least some of the kernels are being cut from the ear.

3. A subassembly comprising an annular rotor provided with a central opening, a first group of devices respectively pivotally connected to said rotor for movement in a plane substantially perpendicular to the longitudinal axis of the rotor, knives respectively carried by said devices, a second group of devices respectively pivotally connected to said rotor for movement in a plane substantially perpendicular to the longitudinal axis of said rotor, ear engaging means respectively carried by said second group of devices, means respectively pivotally connecting the devices of the first group with those of the second group to provide a plurality of connected independently operable assemblies whereby the devices of said first group will be caused to pivot through lesser proportional ranges of movement than those of the adjacent devices of said second group when the latter are forcibly moved in response to pressure applied by an ear against said engaging means, and a plurality of resilient means respectively connected to said rotor and said assemblies for independently biasing said assemblies toward the center of said opening.

4. A subassembly comprising an annular rotor provided with a central opening and with means affording its support and rotation, a first group of devices respectively pivotally connected to said rotor for movement in a plane substantially perpendicular to its longitudinal axis, knives respectively carried by said first group of devices, a second group of devices respectively pivotally connected to said rotor for movement in a plane parallel to the plane of movement of said first group of devices, ear engaging means respectively carried by said second group of devices, means respectively operatively connecting the devices of the second group with those of the first group to provide a plurality of connected independently operable assemblies whereby said second group will be caused to pivot through a greater range of movement than those of the first group when the engaging means of the second group are engaged and forcibly moved in response to pressure applied thereto by an ear, and means for biasing said assemblies toward the center of said opening.

5. A subassembly comprising an annular rotor provided with a central opening, a first group of devices respectively pivotally connected to said rotor for movement in a plane substantially perpendicular to the longitudinal axis of the rotor, knives respectively carried by said first group of devices, a second group of devices respectively pivotally connected to said rotor for movement in a plane parallel to the plane of movement of said first group of devices, ear engaging means respectively carried by said second group of devices, a plurality of means respectively pivotally connecting the devices of the first group with those of the second group to provide a plurality of independently operable assemblies and so that the points of connection between the devices of the first group and adjacent devices of the second group are spaced apart distances less than the distances between the points of connection between the devices and the rotor in order that the distances between the points of connection of the devices of the first group with the rotor and said connect- the devices of the second group with the rotor and said connecting means whereby said first group of devices will be caused to move a lesser distance than those of said second group when the engaging menas are forcibly engaged and moved in response to pressure applied by an ear, and a plurality of resilient means respectively connected to said rotor and to said assemblies for independently urging the latter toward the center of said opening.

6. A machine of the kind described for moving a product in a longitudinal path, a rotor provided with a central opening a first set of supports pivotally mounted on said rotor and respectively carrying guide means, a second set of supports pivotally mounted on said rotor and respectively carrying knives, means operatively connecting said supports of both sets to provide a plurality of independently operable assemblies and for effecting lesser proportional ranges of movement of said second set of supports than those of said first set when said guide means are engaged to move said first set in response to pressure exerted by an ear introduced between said guide means, and means acting on each assembly for normally urging said guide means and said knives toward the center of said opening.

7. A structure of the kind described comprising an annular rotor provided a central opening, a first elongate support having one end pivotally connected to said rotor for movement in a plane perpendicular to its longitudinal axis, a guide carried by the opposite end of said support for engaging a product to be cut, a second elongate support having one end pivotally connected to said rotor at a location spaced from the connection between said first support and said rotor, a knife carried by said second support, and means operatively connecting said supports to provide independently operable assemblies so that said second support of each assembly will be caused to pivot a shorter distance than said first support of each assembly when the latter support is moved in response to pressure apllied to said guide.

8. The structure defined in claim 7, including means assisting to convey a product to and through the opening in said rotor, and means assisting to convey the product through and from the rotor adapted for operation in timed relation with said first-mentioned means.

9. A machine of the kind described comprising a mounting provided with circumferentially spaced rotatable bearing means, an annular rotor carried by said bearing means, means for rotating said rotor, a plurality of supports pivotally connected to said rotor for movement in a plane substantially perpendicular to the longitudinal axis of said rotor, knives respectively carried by said supports for cutting a product adapted for movement along longitudinal axis, and a plurality of independently operable movable means pivotally connected to said rotor and being responsive to movement by engagement with the product for controlling proportionally the independent movement of each support to gauge the depth of the cut.

10. A cutter assembly of the kind described comprising an annular rotor provided with a central opening, a plurality of supports pivotally connected to said rotor for movement independently of one another in a plane substantially perpendicular to the longitudinal axis of the rotor and provided with knives for cutting a product as it travels on said axis, means operatively connected to said rotor and to each of said supports for engaging the product to determine the depth of the cut, and means acting independently on each support for urging each knife toward the center of said opening.

11. A cutter assembly of the kind described comprising an annular rotor, a plurality of supports respectively pivotally connected to said rotor for movement in a plane substantially perpendicular to the longitudinal axis of the rotor and respectively provided with knives for cutting an elongate product of variable contour as it travels on said axis, a plurality of means respectively operatively connected to said rotor and said supports and movable in response to pressure applied thereto by the product for varying the depth of the cut of each knife in accord with the contour of the product, and means for biasing each of said means independently toward said axis.

(References on following page)

References Cited by the Examiner

UNITED STATES PATENTS

| | | | |
|---|---|---|---|
| 670,687 | 3/01 | Ritty | 130—9.2 |
| 1,282,788 | 10/18 | Fenn | 130—9.4 |
| 1,282,789 | 10/18 | Fenn | 130—9.4 |
| 1,282,790 | 10/18 | Fenn | 130—9.2 |
| 1,282,791 | 10/18 | Fenn | 130—9.2 |
| 2,034,993 | 3/36 | Schmidt | 130—9.2 |
| 2,119,945 | 6/38 | Seloske | 130—9.2 |
| 2,188,934 | 2/40 | Wheeler | 130—9.2 |
| 2,216,065 | 9/40 | Cover | 130—9.1 |
| 2,434,316 | 1/48 | Golden | 17—1 |
| 2,792,839 | 5/57 | Sheridan | 130—9.1 |
| 2,951,484 | 9/60 | Cover et al. | 130—9.1 |

ANTONIO F. GUIDA, *Acting Primary Examiner.*

ARNOLD RUEGG, *Examiner.*